US010934434B2

(12) United States Patent
Bueno Perisé et al.

(10) Patent No.: US 10,934,434 B2
(45) Date of Patent: Mar. 2, 2021

(54) ASPHALT COMPOSITION FOR ROAD PAVEMENT

(71) Applicants: KAO CORPORATION, Tokyo (JP); KAO CHEMICALS EUROPE S.L., Barcelona (ES)

(72) Inventors: Agusti Bueno Perisé, Barcelona (ES); Eiji Shirai, Wakayama (JP)

(73) Assignees: KAO CORPORATION, Tokyo (JP); KAO CHEMICALS EUROPE S.L., Barcelona (ES)

( * ) Notice: Subject to any disclaimer, the term of this patent is extended or adjusted under 35 U.S.C. 154(b) by 119 days.

(21) Appl. No.: 16/071,316

(22) PCT Filed: Jan. 18, 2017

(86) PCT No.: PCT/EP2017/050958
§ 371 (c)(1),
(2) Date: Jul. 19, 2018

(87) PCT Pub. No.: WO2017/125421
PCT Pub. Date: Jul. 27, 2017

(65) Prior Publication Data
US 2020/0181409 A1 Jun. 11, 2020

(30) Foreign Application Priority Data
Jan. 20, 2016 (EP) .................................... 16382021

(51) Int. Cl.
*C08L 95/00* (2006.01)
*C08L 67/02* (2006.01)
*E01C 11/00* (2006.01)
*E01C 7/18* (2006.01)

(52) U.S. Cl.
CPC ............... *C08L 95/00* (2013.01); *C08L 67/02* (2013.01); *E01C 7/187* (2013.01); *E01C 11/005* (2013.01); *C08L 2555/22* (2013.01); *C08L 2555/24* (2013.01); *C08L 2555/52* (2013.01); *C08L 2555/80* (2013.01)

(58) Field of Classification Search
None
See application file for complete search history.

(56) References Cited

U.S. PATENT DOCUMENTS

| 5,990,206 | A | 11/1999 | Tanaka et al. | |
|---|---|---|---|---|
| 8,709,693 | B2* | 4/2014 | Yamasaki | C08G 63/676 399/252 |
| 2008/0296195 | A1* | 12/2008 | Suarez | B65D 90/205 206/524.1 |
| 2011/0182596 | A1* | 7/2011 | Ishii | G03G 15/50 399/31 |

FOREIGN PATENT DOCUMENTS

| JP | 4-008766 A | 1/1992 |
|---|---|---|
| JP | 11-124498 A | 5/1999 |
| JP | 2005-126998 A | 5/2005 |

OTHER PUBLICATIONS

English abstract of JP 2006017954 A, Jan. 19, 2006, Japan, 4 pages.*
International Preliminary Report on Patentability (PCT/IPEA/409 and PCT/IPEA/416) issued in PCT/EP2017/050958, dated Jan. 8, 2018.
International Search Report (PCT/ISA/210) issued in PCT/EP2017/050958, dated Apr. 5, 2017.
Moghaddam et al., "Properties of SMA Mixtures Containing Waste Polyethylene Terephthalate", International Journal of Chemical and Biological Engineering, vol. 6, 2012, pp. 188-191.
Written Opinion (PCT/ISA/237) issued in PCT/EP2017/050958, dated Apr. 5, 2017.

* cited by examiner

*Primary Examiner* — Tae H Yoon
(74) *Attorney, Agent, or Firm* — Birch, Stewart, Kolasch & Birch, LLP

(57) ABSTRACT

Asphalt composition for road pavement, excellent in drying strength, strength after immersion in water, and strength after immersion in petroleum, method for producing same, and road paving method. Composition comprises asphalt, polyester, and aggregate. Polyester has alcohol component-derived constituent unit containing ≥65 mol % bisphenol A/alkylene oxide adduct and carboxylic acid component-derived constituent unit containing ≥50 mol % terephthalic or isophthalic acid. Composition has softening point of 95°–130° C., hydroxyl group value of 20-50 mgKOH/g, and ratio of polyester resin of 5-50 parts by mass based on 100 parts by mass of the asphalt. Production method comprising mixing asphalt, the polyester, and aggregate at 130-200° C. for ≥30 seconds. Polyester resin is mixed in ratio of 5-50 parts by mass based on 100 parts by mass of asphalt. Road paving method comprises laying asphalt composition obtained by production method as set forth, thereby forming an asphalt paving material layer.

9 Claims, No Drawings

ASPHALT COMPOSITION FOR ROAD PAVEMENT

CROSS REFERENCE TO RELATED APPLICATIONS

This application is the National Phase in the United States of International Application No. PCT/EP2017/050958, filed on Jan. 18, 2017, which claims priority under 35 U.S.C. 119(a) to Patent Application No. 16382021.0, filed in the European Patent Office on Jan. 20, 2016. The foregoing applications are hereby expressly incorporated by reference into the present application.

FIELD OF THE INVENTION

The present invention relates to an asphalt composition for road pavement, a method for producing the same, and a road paving method.

BACKGROUND OF THE INVENTION

Asphalt pavement using an asphalt composition has been performed for paving driveways, parking spaces, cargo yards, sidewalks, etc., because of relatively easy construction and a short period of time from beginning of paving works to traffic start.

The asphalt pavement includes a road surface which is formed of an asphalt composition containing aggregates bonded with each other through asphalt, and hence, paved roads exhibit good hardness and good durability.

However, since asphalt is a petroleum refined product, it has such properties that it is apt to be dissolved in similar petroleum refined products, such as gasoline, light oils, heavy oils, kerosene, and engine lubricants. For this reason, if fuels or lubricants leak on the road surface from vehicles, etc., the asphalt tends to be dissolved in the fuels or lubricants, which will lead to erosion of the asphalt composition and occurrence of pavement destruction, such as formation of pot holes. Therefore, in such a case, repair of the pavement is inevitably needed, which results in increased maintenance costs and significant influence on car traffic.

PTL 1 describes a composition for road pavement, which is used for constructing a surface layer (topcoat layer) of a paving body. Here, as a composition for road pavement having sufficient strength and capable of revealing the strength at an early stage and making it possible to efficiently form or repair a paving body, PTL 1 describes a composition for road pavement containing a water dispersion resulting from neutralizing a resin (A) having an acid value of 3 to 100 KOHmg/g with a basic compound, and a silane coupling agent having an alkoxy group having 1 to 5 carbon atoms and an amino group, the composition constituting a binder for an aggregate in the road pavement or a surface layer of a paving body.

PTL 2 describes an asphalt roofing sheet to be laid as a waterproof sheet, etc., for roofs of buildings, etc. Here, as a nonwoven fabric capable of satisfying heat-resistant morphological properties, strength, elongation, and water resistance, an aqueous resin composition for impregnating the nonwoven fabric, and an asphalt roofing sheet using the same, PTL 2 discloses an aqueous resin composition for impregnating a nonwoven fabric, which contains (A) a prescribed polyurethane resin, (B) a water-soluble polymer having an OH group, and (C) a prescribed crosslinking agent, the composition satisfying a value of (A)/(B) (weight ratio) of 1/99 to 20/80 and a value of ((A)+(B))/(C) (weight ratio) of 99.9/0.1 to 70/30, and an asphalt roofing sheet having asphalt impregnated in the nonwoven fabric.

As an asphalt composition suitable for road pavement, which is capable of being laid even at low temperatures and preventing the rut of a wheel of a running vehicle on a road which is stable even at high temperatures, PTL 3 describes an asphalt composition containing asphalt and a polyester-based polymer.

CITATION LIST

Patent Literature

PTL 1: JP 2005-126998A
PTL 2: JP 11-124498A
PTL 3: JP 04-008766A

SUMMARY OF THE INVENTION

The present invention relates to the following [1] to [3].

[1] An asphalt composition for road pavement including:
  asphalt;
  a polyester resin; and
  an aggregate,
  wherein the polyester resin is a polyester having an alcohol component-derived constituent unit containing 65 mol % or more of an alkylene oxide adduct of bisphenol A and a carboxylic acid component-derived constituent unit containing 50 mol % or more of at least one selected from the group consisting of terephthalic acid and isophthalic acid and has a softening point of 95° C. or higher and 130° C. or lower and a hydroxyl group value of 20 mgKOH/g or more and 50 mgKOH/g or less, and
  a ratio of the polyester resin is 5 parts by mass or more and 50 parts by mass or less based on 100 parts by mass of the asphalt.

[2] A method for producing an asphalt composition for road pavement including:
  a step of mixing asphalt, a polyester resin, and an aggregate at 130° C. or higher and 200° C. or lower for 30 seconds or more,
  wherein the polyester resin is a polyester having an alcohol component-derived constituent unit containing 65 mol % or more of an alkylene oxide adduct of bisphenol A and a carboxylic acid component-derived constituent unit containing 50 mol % or more of at least one selected from the group consisting of terephthalic acid and isophthalic acid and has a softening point of 95° C. or higher and 130° C. or lower and a hydroxyl group value of 20 mgKOH/g or more and 50 mgKOH/g or less, and
  the polyester resin is mixed in a ratio of 5 parts by mass or more and 50 parts by mass or less based on 100 parts by mass of the asphalt.

[3] A road paving method including a step of laying an asphalt composition obtained by the method as set forth above in [2], thereby forming an asphalt paving material layer.

DETAILED DESCRIPTION OF THE INVENTION

Such an asphalt composition that even in a rainy weather or even when immersed in the leaked gasoline or oil, it keeps high strength and is hardly rutted has been required.

Now, the present invention relates to an asphalt composition for road pavement, which is excellent in dry strength, strength after immersion in water, and strength after immersion in petroleum, a method for producing the same, and a road paving method using the same.

The present invention relates to the following [1] to [3].

[1] An asphalt composition for road pavement including:
asphalt;
a polyester resin; and
an aggregate,
wherein the polyester resin is a polyester having an alcohol component-derived constituent unit containing 65 mol % or more of an alkylene oxide adduct of bisphenol A and a carboxylic acid component-derived constituent unit containing 50 mol % or more of at least one selected from the group consisting of terephthalic acid and isophthalic acid and has a softening point of 95° C. or higher and 130° C. or lower and a hydroxyl group value of 20 mgKOH/g or more and 50 mgKOH/g or less, and
a ratio of the polyester resin is 5 parts by mass or more and 50 parts by mass or less based on 100 parts by mass of the asphalt.

[2] A method for producing an asphalt composition for road pavement including:
a step of mixing asphalt, a polyester resin, and an aggregate at 130° C. or higher and 200° C. or lower for 30 seconds or more,
wherein the polyester resin is a polyester having an alcohol component-derived constituent unit containing 65 mol % or more of an alkylene oxide adduct of bisphenol A and a carboxylic acid component-derived constituent unit containing 50 mol % or more of at least one selected from the group consisting of terephthalic acid and isophthalic acid and has a softening point of 95° C. or higher and 130° C. or lower and a hydroxyl group value of 20 mgKOH/g or more and 50 mgKOH/g or less, and
the polyester resin is mixed in a ratio of 5 parts by mass or more and 50 parts by mass or less based on 100 parts by mass of the asphalt.

[3] A road paving method including a step of laying an asphalt composition obtained by the method as set forth above in [2], thereby forming an asphalt paving material layer.

According to the present invention, it is possible to provide an asphalt composition for road pavement, which is excellent in dry strength, strength after immersion in water, and strength after immersion in petroleum, a method for producing the same, and a road paving method using the same.

Asphalt Composition for Road Pavement

The asphalt composition for road pavement of the present invention contains asphalt, a polyester resin, and an aggregate.

The polyester resin is a polyester having an alcohol component-derived constituent unit containing 65 mol % or more of an alkylene oxide adduct of bisphenol A and a carboxylic acid component-derived constituent unit containing 50 mol % or more of at least one selected from the group consisting of terephthalic acid and isophthalic acid and has a softening point of 95° C. or higher and 130° C. or lower and a hydroxyl group value of 20 mgKOH/g or more and 50 mgKOH/g or less.

A ratio of the polyester resin is 5 parts by mass or more and 50 parts by mass or less based on 100 parts by mass of the asphalt.

According to the asphalt composition for road pavement of the present invention, the dry strength, the strength after immersion in water, and the strength after immersion in petroleum are excellent. Though reasons for that are not always elucidated yet, the following may be considered.

It may be considered that in view of the fact that the polyester resin is contained in the asphalt composition for road pavement, the polyester resin is melted and dispersed in the asphalt, and when contacted with the aggregate, the resulting dispersion covers the surfaces of the aggregate and increases the adhesive strength among the aggregate to each other, thereby increasing the strength at a normal time; meanwhile, even in the case where the asphalt is dissolved in gasoline, etc., an effect for keeping the strength through adhesion with the polyester resin is obtained.

In addition, it may be considered that by using the polyester having a softening point and a glass transition point each falling within a prescribed range and also having a prescribed structure, the polyester in the asphalt composition is apt to be dissolved or dispersed in the asphalt at the time of laying.

Meanwhile, it may be considered that by containing the polyester having a hydroxyl group value falling within a prescribed range, after laying, the polyester exhibits high adsorptivity to the aggregate, and the hydrogen bond becomes firm, whereby the adhesive strength is also improved.

Asphalt

As the asphalt which is used in the present invention, for example, various kinds of asphalts may be used. Examples thereof include straight asphalt that is petroleum asphalt for pavement, as well as modified asphalts.

The straight asphalt as referred to herein refers to a residual bituminous material obtained by applying a crude oil to an atmospheric distillation apparatus, a vacuum distillation apparatus, etc.

Examples of the modified asphalts include blown asphalts, and asphalts modified with a polymer material, such as a thermoplastic elastomer and a thermoplastic resin.

Examples of the thermoplastic elastomer include a styrene/butadiene/block copolymer (SBS), a styrene/isoprene/block copolymer (SIS), and an ethylene/vinyl acetate copolymer (EVA).

Examples of the thermoplastic resin include an ethylene/vinyl acetate copolymer, an ethylene/ethyl acrylate copolymer, polyethylene, and polypropylene.

Of these, straight asphalt is preferred.

A needle penetration of the asphalt, especially straight asphalt, is preferably more than 40, and it is preferably 120 or less, more preferably 80 or less, and still more preferably 60 or less. A measurement method of the needle penetration conforms to the method standardized in JIS K2207. It is to be noted that a length of 0.1 mm when a prescribed needle penetrates vertically into a sample under test conditions prescribed in JIS K2207 is expressed as 1.

A content of the asphalt in the asphalt composition is preferably 2% by mass or more, and more preferably 3% by mass or more, and it is preferably 15% by mass or less, more preferably 10% by mass or less, and still more preferably 8% by mass or less.

Polyester Resin

The polyester resin is a polyester containing an alcohol component-derived constituent unit and a carboxylic acid component-derived constituent unit.

In the polyester, the alcohol component-derived constituent unit as referred to herein means a structure resulting from eliminating a hydrogen atom from the hydroxyl group of the alcohol component; and the carboxylic acid component-derived constituent unit as referred to herein means a structure resulting from eliminating a hydroxyl group from the carboxyl group of the carboxylic acid component.

Alcohol Component

Examples of the alcohol component include aliphatic diols, aromatic diols, and trihydric or polyhydric alcohols. These alcohol components may be used alone or in combination with two or more kinds thereof.

From the viewpoint of exhibiting excellent dry strength, the alcohol component contains alkylene oxide adduct of bisphenol A, and preferably contains an alkylene oxide adduct of biphenol A represented by the following formula (I);

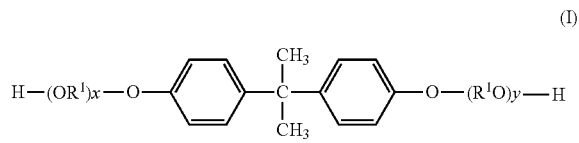

wherein
each of $OR^1$ and $R^1O$ represents an alkylene oxide; $R^1$ represents an alkylene group having 2 or 3 carbon atoms; each of x and y represents a positive number expressing an average addition molar number of the alkylene oxide; and a sum total of x and y is 1 or more, and preferably 1.5 or more, and it is 16 or less, preferably 8 or less, and more preferably 4 or less.

Examples of the alkylene oxide adduct of bisphenol A represented by the foregoing formula (I) include a propylene oxide adduct of 2,2-bis(4-hydroxyphenyl)propane and an ethylene oxide adduct of 2,2-bis(4-hydroxyphenyl)propane. Of these, a combination of a propylene oxide adduct of 2,2-bis(4-hydroxyphenyl)propane and an ethylene oxide adduct of 2,2-bis(4-hydroxyphenyl)propane is preferred.

In the alcohol component, an amount of the alkylene oxide adduct of bisphenol A is 65 mol % or more, more preferably 75 mol % or more, still more preferably 90 mol % or more, and yet still more preferably 100 mol % from the viewpoints of increasing melt-dispersibility in the asphalt and obtaining excellent dry strength.

A molar ratio of the propylene oxide adduct of bisphenol A to the ethylene oxide adduct of bisphenol A is preferably 10/90 or more, more preferably 20/80 or more, and still more preferably 30/70 or more from the viewpoints of more increasing the melt-dispersibility in the asphalt and obtaining more excellent dry strength and also from the viewpoint of improving strength after immersion in water, and it is preferably 70/30 or less, more preferably 60/40 or less, and still more preferably 50/50 or less from the viewpoints of more increasing the melt-dispersibility in the asphalt and obtaining more excellent dry strength and also the viewpoint of improving strength after immersion in petroleum.

Carboxylic Acid Component

From the viewpoint of obtaining excellent dry strength, the carboxylic acid component contains at least one selected from terephthalic acid and isophthalic acid and more preferably contains terephthalic acid.

In the carboxylic acid component, an amount of at least one selected from terephthalic acid and isophthalic acid is 50 mol % or more, preferably 60 mol % or more, preferably 80 mol % or more, and more preferably 100 mol % from the viewpoints of revealing excellent melt-dispersibility in the asphalt and improving the dry strength.

Examples of other carboxylic acid component include aromatic dicarboxylic acids other than terephthalic acid and isophthalic acid (hereinafter also referred to as "other aromatic dicarboxylic acid"), aliphatic dicarboxylic acids, trivalent or higher-valent carboxylic acids, and acid anhydrides or alkyl (carbon number: 1 or more and 3 or less) esters thereof. These carboxylic acid components may be used alone or in combination of two or more kinds thereof.

From the viewpoint of more improving the dry strength, the carbon number of the main chain of the aliphatic dicarboxylic acid is preferably 4 or more, and it is preferably 10 or less, more preferably 8 or less, and still more preferably 6 or less.

Specific examples thereof include oxalic acid, malonic acid, maleic acid, fumaric acid, citraconic acid, itaconic acid, glutaconic acid, succinic acid, adipic acid, suberic acid, azelaic acid, sebacic acid, and dodecane diacid. In addition, examples of the aliphatic dicarboxylic acid also include succinic acids substituted with an alkyl group having 1 or more and 20 or less carbon atoms or an alkenyl group having 2 or more and 20 or less carbon atoms, such as dodecyl succinic acid, dodecenyl succinic acid, and octenyl succinic acid. Of these, from the viewpoint of more improving the dry strength, adipic acid, fumaric acid, dodecenyl succinic acid, or octenyl succinic acid is preferred, with adipic acid being more preferred.

In the case where the other dicarboxylic acid is contained in the carboxylic acid component that is a raw material monomer of the polyester resin, from the viewpoint of more improving the dry strength, a content of the other dicarboxylic acid is preferably 0.1 mol % or more, more preferably 1 mol % or more, and still more preferably 5 mol % or more, and it is preferably 40 mol % or less, more preferably 35 mol % or less, and still more preferably 30 mol % or less.

Examples of the trivalent or higher-valent carboxylic acid include trimellitic acid, 2,5,7-naphthalenetricarboxylic acid and pyromellitic acid, or acid anhydrides thereof. From the viewpoint of more improving the dry strength, trimellitic acid or acjd anhydride thereof is preferred.

In the carboxylic acid component, from the viewpoint of more improving the dry strength, a content of the trivalent or higher-valent carboxylic acid is preferably 1 mol % or more, more preferably 3 mol % or more, and still more preferably 5 mol % or more, and it is preferably 30 mol % or less, more preferably 20 mol % or less, and still more preferably 10 mol % or less.

Molar Ratio of Carboxylic Acid Component-Derived Constituent Unit to Alcohol Component-Derived Constituent Unit From the viewpoint of controlling the hydroxyl group value, a molar ratio of the carboxylic acid component-derived constituent unit to the alcohol component-derived constituent unit [(carboxylic acid component)/(alcohol component)] is preferably 0.7 or more, and more preferably 0.8 or more, and it is preferably 1.5 or less, more preferably 1.3 or less, still more preferably 1.1 or less, and yet still more preferably less than 1.0.

A proportion of a divalent alcohol-derived constituent component and a divalent carboxylic acid-derived constituent component in the polyester resin is preferably 95 mol % or more, more preferably 98 mol % or more, and still more preferably 100 mol % from the viewpoints of increasing the dispersibility and increasing the dry strength.

It is to be noted that from viewpoint of controlling physical properties, a monohydric alcohol may be properly contained in the alcohol component, and a monovalent carboxylic acid compound may be properly contained in the carboxylic acid component.

Physical Properties of Polyester Resin

An acid value of the polyester resin is preferably 2 mgKOH/g or more, more preferably 3 mgKOH/g or more, and still more preferably 3.5 mgKOH/g or more, and it is preferably 20 mgKOH/g or less, more preferably 15 mgKOH/g or less, more preferably 12 mgKOH/g or less, and still more preferably 10 mgKOH/g or less.

A hydroxyl group value of the polyester resin is 20 mgKOH/g or more from the viewpoints of exhibiting high adhesive strength to the aggregate and improving the dry strength; and it is 50 mgKOH/g or less, and preferably 45 mgKOH/g or less from the viewpoint of improving the dry strength and the strength after immersion in water.

A softening point of the polyester resin is 95° C. or higher, and preferably 100° C. or higher from the viewpoints of exhibiting high adhesive strength to the aggregate and improving the dry strength; and it is 130° C. or lower from the viewpoints of revealing the melt-dispersibility in the asphalt and improving the dry strength.

A glass transition point of the polyester resin is preferably 50° C. or higher, and more preferably 55° C. or higher from the viewpoint of improving the dry strength; and it is preferably 80° C. or lower, and more preferably 70° C. or lower from the viewpoint of improving the dry strength.

It is to be noted that the acid value, the hydroxyl group value, the softening point, and the glass transition point may be controlled by a raw material monomer composition, a molecular weight, a catalyst amount, or reaction conditions.

In addition, the polyester resin may be used alone or in combination of two or more kinds thereof. In the case of jointly using two or more kinds of the polyester resins, the softening point is a value of the mixture as determined by the method of the examples.

Production Method of Polyester Resin

Although a method for producing the polyester resin is not particularly limited, for example, the polyester resin may be produced by subjecting the alcohol component and the carboxylic acid component as described above to polycondensation.

A blending amount of each of the alcohol component and the carboxylic acid component is a blending amount such that the molar ratio of the carboxylic acid component-derived constituent unit to the alcohol component-derived constituent unit [(carboxylic acid component)/(alcohol component)] falls with the foregoing numerical value range.

That is, as for the method for producing the polyester resin, the polyester resin may be, for example, produced by subjecting the alcohol component and the carboxylic acid component as described above to polycondensation in a blending amount such that the molar ratio of the carboxylic acid component-derived constituent unit to the alcohol component-derived constituent unit [(carboxylic acid component)/(alcohol component)] falls within the foregoing numerical value range.

From the viewpoint of reactivity, a temperature of the polycondensation reaction is preferably 160° C. or higher, more preferably 190° C. or higher, and still more preferably 220° C. or higher, and it is preferably 260° C. or lower, more preferably 250° C. or lower, and still more preferably 240° C. or lower.

Examples of an esterification catalyst which is used for the polycondensation reaction include titanium compounds and tin(II) compounds not having an Sn—C bond. These may be used alone or in combination of two or more kinds thereof.

As the titanium compound, titanium compounds having a Ti—O bond are preferred, and titanium compounds having an alkoxy group, an alkenyloxy group, or an acyloxy group, each having a total carbon number of 1 or more and 28 or less, are more preferred.

As the tin(II) compound not having an Sn—C bond, tin(II) compounds having an Sn—O bond and tin(II) compounds having an Sn—X (X represents a halogen atom) bond are preferably exemplified, with tin(II) compounds having an Sn—O bond being more preferred. Above all, tin(II) di(2-ethylhexanoate) is more preferred from the viewpoints of reactivity, control of molecular weight, and control of physical properties of composite resin.

From the viewpoint of reactivity, a use amount of the esterification catalyst is preferably 0.01 parts by mass or more, more preferably 0.1 parts by mass or more, and still more preferably 0.2 parts by mass or more, and it is preferably 1.5 parts by mass or less, more preferably 1.0 part by mass or less, and still more preferably 0.6 parts by mass or less, based on 100 parts by mass of a total amount of the alcohol component and the carboxylic acid component.

As an esterification cocatalyst, pyrogallol compounds are preferred. Such a pyrogallol compound is a compound having a benzene ring in which three hydrogen atoms adjacent to each other are substituted with a hydroxyl group, and examples thereof include pyrogallol, gallic acid, gallic acid esters, benzophenone derivatives, such as 2,3,4-trihydroxybenzophenone and 2,2',3,4-tetrahydroxybenzophenone, and catechin derivatives, such as epigallocatechin and epigallocatechin gallate. From the viewpoint of reactivity, gallic acid is preferred.

From the viewpoint of reactivity, a use amount of the esterification cocatalyst is preferably 0.001 parts by mass or more, more preferably 0.005 parts by mass or more, and still more preferably 0.01 parts by mass or more, and it is preferably 0.15 parts by mass or less, more preferably 0.10 parts by mass or less, and still more preferably 0.05 parts by mass or less, based on 100 parts by mass of a total amount of the alcohol component and the carboxylic acid component.

Ratio of Polyester Resin

From the viewpoint of improving the dry strength, a ratio of the polyester resin is 5 parts by mass or more, preferably 8 parts by mass or more, more preferably 10 parts by mass or more, and still more preferably 15 parts by mass or more, and it is 50 parts by mass or less, preferably 40 parts by mass or less, and more preferably 30 parts by mass or less, based on 100 parts by mass of the asphalt.

Average Particle Diameter of Polyester Resin

The polyester resin is preferably a polyester resin particle.

An average particle diameter of the polyester resin particle is preferably 200 μm or more, more preferably 400 μm or more, and still more preferably 600 μm or more from the viewpoints of increasing the dispersibility of the resin and improving the dry strength; and it is preferably 1,700 μm or less, more preferably 1,500 μm or less, and still more preferably 1,200 μm or less from the viewpoints of increasing the dispersibility of the resin and improving the dry strength.

It is to be noted that the average particle diameter is a value measured in conformity with the prescription of JIS Z8815. Specifically, a sample is sieved with seven sieves having a sieve opening of 2,830 μm, 2,000 μm, 1,400 μm, 850 μm, 600 μm, 425 μm, and 106 μm, respectively. The average particle diameter is the weighted average of the particle diameter being calculated by the weights of the remained samples in the sieves, as the samples having a diameter of the sieve opening.

The polyester resin particle is obtained by pulverizing the polyester resin or dispersing the polyester resin in an aqueous solvent. Above all, it is preferred to obtain the polyester resin particle through pulverization. Examples of commercially available products of a pulverizer which is used for the pulverization include "SF-1", manufactured by Sanriki Seisakusho Co., Ltd.

Aggregate

The asphalt composition of the present invention contains an aggregate.

The aggregate may be, for example, optionally selected from crushed stone, cobble stone, gravel, sand, reclaimed aggregate, and ceramics, and used.

As the aggregate, all of a coarse aggregate having a particle diameter of 2.5 mm or more and a fine aggregate having a particle diameter of less than 2.5 mm may be used.

Examples of the coarse aggregate include No. 7 crushed stone having particle diameter range of 2.5 mm or more and 5 mm or less, No. 6 crushed stone having particle diameter range of 5 mm or more and 13 mm or less, No. 5 crushed stone having particle diameter range of 13 mm or more and 20 mm or less, No. 4 crushed stone having particle diameter range of 20 mm or more and 30 mm or less.

The fine aggregate is preferably a fine aggregate having particle diameter of 0.075 mm or more and less than 2.5 mm. Examples of the fine aggregate include river sand, hill sand, mountain sand, sea sand, crushed sand, fine sand, screenings, crushed stone dust, silica sand, artificial sand, glass cullet, molding sand, recycled aggregate-crushed sand.

The particle diameter is a nominal size of sieve defined in JIS 5001-1995.

Of these, a combination of the coarse aggregate and the fine aggregate is preferred.

The fine aggregate may include a filler having a particle diameter of less than 0.075 mm (Examples include sand). The lower limit of the average particle diameter of the filler is, for example, 0.001 mm or more.

The average particle diameter of the filler is preferably 0.001 mm or more from the viewpoints of improving the dry strength; and it is preferably 0.05 mm or less, more preferably 0.03 mm or less, and still more preferably 0.02 mm or less from the viewpoints of the same. The average particle diameter of the filler can be measured by laser diffraction particle size analyzers. Here, the average particle diameter means an average particle diameter of 50% cumulative volume.

Measurement Method of the Average Particle Diameter of the Filler

The average particle diameter of the filler is a value measured by a laser diffraction particle size analyzer (LA-950, manufactured by HORIBA, Ltd.) with following condition.

Measurement Method: Flow method
Dispersion Media: Ethanol
Sample Preparation: 2 mg/100 mL
Dispersing method: Stirring and 1 minute of built-in ultrasonic waves Examples of the filler include a sand, a fly ash, a calcium carbonate and a hydrated lime. Of these, a calcium carbonate is preferable from the viewpoints of improving the dry strength.

A mass ratio of the coarse aggregate to the fine aggregate is preferably 10/100 or more, more preferably 20/100 or more, and still more preferably 30/100 or more, and it is preferably 90/100 or less, more preferably 80/100 or less, and still more preferably 70/100 or less.

A content of the aggregate is preferably 1,000 parts by mass or more, more preferably 1,200 parts by mass or more, and still more preferably 1,500 parts by mass or more, and it is preferably 3,000 parts by mass or less, more preferably 2,500 parts by mass or less, and still more preferably 2,000 parts by mass or less, based on 100 parts by mass of a sum total of the asphalt and the polyester resin.

Suitable blending examples of the asphalt composition of the present invention are as follows.

(1) An example of the asphalt composition includes, for example, 30% by volume or more and less than 45% by volume of the coarse aggregate, 30% by volume or more and 50% by volume or less of the fine aggregate, 5% by volume or more and 10% by volume or less of the asphalt, and the polyester resin (fine-graded asphalt).

(2) An example of the asphalt composition includes, for example, 45% by volume or more and less than 70% by volume of the coarse aggregate, 20% by volume or more and 45% by volume or less of the fine aggregate, 3% by volume or more and 10% by volume or less of the asphalt, and the polyester resin (dense-graded asphalt).

(3) An example of the asphalt composition includes, for example, 70% by volume or more and 80% by volume or less of the coarse aggregate, 10% by volume or more and 20% by volume or less of the fine aggregate, 3% by volume or more and 10% by volume or less of the asphalt, and the polyester resin (porous asphalt).

In the present invention, other components may be further blended, if desired.

It is to be noted that the blending ratio of asphalt in the conventional asphalt compositions containing an aggregate and the asphalt may be in general determined by referring to an optimum asphalt amount obtained from "Formulation and Design of Asphalt Mixture" as described in "Guideline for Pavement Design and Construction" published by Japan Road Association.

In the present invention, the above-described optimum asphalt amount corresponds to the total amount of the asphalt and the polyester resin. In consequence, in general, the total amount of the asphalt and the polyester resin blended in the asphalt composition is preferably determined from the above-described optimum asphalt amount.

However, the method of determining the amounts of the respective components in the asphalt composition is not particularly limited to the method as described in "Guideline for Pavement Design and Construction", and the amounts of the respective components in the asphalt composition may also be determined by any other methods.

Production Method of Asphalt Composition

The asphalt composition of the present invention may be used in the form of a heated asphalt composition not substantially containing water, or may also be used in the form of a cold asphalt mixture which is an asphalt emulsion prepared by blending the above-described asphalt composition with an emulsifier or water.

In particular, in the asphalt composition of the present invention, the polyester resin is apt to be uniformly dispersed in the asphalt composition. Therefore, when the asphalt composition of the present invention is used in the form of a heated asphalt composition, it is able to effectively exhibit its characteristic features.

In the case of using the asphalt composition of the present invention in the form of a heated asphalt composition, the method for producing the asphalt composition is not particularly limited, and the asphalt composition of the present invention may be produced by any methods. However, in general, the asphalt composition of the present invention may be produced according to any method for producing asphalt compositions containing an aggregate and asphalt.

The method for producing the asphalt composition of the present invention preferably includes a step of mixing the asphalt, the polyester resin, and the aggregate at 130° C. or higher and 200° C. or lower for 30 seconds or more (hereinafter also referred to as "Step 1").

The mixing temperature in Step 1 is preferably a temperature higher than the softening point of the polyester resin. Specifically, the mixing temperature in Step 1 is preferably 140° C. or higher, and it is preferably 190° C. or lower, and more preferably 180° C. or lower.

Although an upper limit of the mixing time in Step 1 is not particularly limited, for example, it is about 30 minutes.

As the specific production method, there may be used the conventional method for production of asphalt compositions which is known as a so-called plant mix (premix) method in which, in the step of mixing an aggregate with asphalt, the polyester resin may be charged together with the asphalts. However, in this case, in order to melt the polyester resin, it is preferred to previously make the temperature of the aggregate higher than that usually used.

In addition, the asphalt and the polyester resin may be previously mixed while stirring at a high temperature, for example, 130° C. or higher (preferably 150° C. or higher), and then the resulting mixture may be charged (premix method).

As described above, in the method for producing the asphalt composition by blending the polyester resin, the polyester resin is exposed to a high temperature. As for a degree of the high temperature, it is required that the higher the blending proportion of the polyester resin, the higher the temperature is. In consequence, in the case where the blending proportion of the polyester resin is high, the temperature of the asphalt composition becomes higher, so that there is a concern that the polyester resin suffers from heat deterioration. Such a phenomenon tends to occur more frequently as the softening point of the polyester resin becomes higher.

In the present invention, the polyester resin used has a relatively low softening point, and preferably, the blending proportion of the polyester resin in the asphalt composition is reduced. Therefore, the asphalt composition of the present invention is capable of providing a good pavement which is free from any concern about heat deterioration.

Road Paving Method

The asphalt composition of the present invention is used for road pavement.

The road paving method of the present invention preferably includes a step of laying the asphalt composition of the present invention, thereby forming an asphalt paving material layer (hereinafter also referred to as "Step 2").

It is to be noted that in Step 2, the asphalt composition of the present invention may be subjected to compacting laying using the same laying machines and the same laying method as used for ordinary asphalt compositions. In the case of using the asphalt composition in the form of a heated asphalt composition, a compacting temperature thereof is preferably higher than the softening point of the polyester resin. The compacting temperature is preferably 100° C. or higher, more preferably 120° C. or higher, and still more preferably 130° C. or higher, and it is preferably 200° C. or lower, more preferably 180° C. or lower, and still more preferably 170° C. or lower.

With respect to the above-described embodiments, the present invention further discloses the following asphalt composition for road pavement and road paving method.

<1> An asphalt composition for road pavement including:
  asphalt;
  a polyester resin; and
  an aggregate,
wherein the polyester resin is a polyester having an alcohol component-derived constituent unit containing 65 mol % or more of an alkylene oxide adduct of bisphenol A and a carboxylic acid component-derived constituent unit containing 50 mol % or more of at least one selected from the group consisting of terephthalic acid and isophthalic acid and has a softening point of 95° C. or higher and 130° C. or lower and a hydroxyl group value of 20 mgKOH/g or more and 50 mgKOH/g or less, and
a ratio of the polyester resin is 5 parts by mass or more and 50 parts by mass or less based on 100 parts by mass of the asphalt.

<2> The asphalt composition for road pavement as set forth in <1>, wherein the asphalt is straight asphalt.

<3> The asphalt composition for road pavement as set forth in <1> or <2>, wherein a needle penetration of the asphalt is preferably more than 40, and it is preferably 120 or less, more preferably 80 or less, and still more preferably 60 or less.

<4> The asphalt composition for road pavement as set forth in any one of <1> to <3>, wherein a content of the asphalt in the asphalt composition is preferably 2% by mass or more, and more preferably 3% by mass or more, and it is preferably 15% by mass or less, more preferably 10% by mass or less, and still more preferably 8% by mass or less.

<5> The asphalt composition for road pavement as set forth in any one of <1> to <4>, wherein the alcohol component of the polyester resin contains an alkylene oxide adduct of bisphenol A, and preferably contains an alkylene oxide adduct of biphenol A represented by the following formula (I):

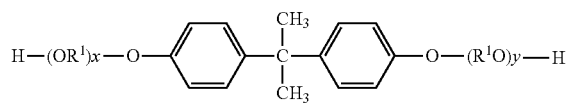
(I)

wherein
each of $OR^1$ and $R^1O$ represents an alkylene oxide; $R^1$ represents an alkylene group having 2 or 3 carbon atoms; each of x and y represents a positive number expressing an average addition molar number of the alkylene oxide; and a sum total of x and y is 1 or more, and preferably 1.5 or more, and it is 16 or less, preferably 8 or less, and more preferably 4 or less.

<6> The asphalt composition for road pavement as set forth in any one of <1> to <5>, wherein the alcohol component of the polyester resin is a combination of a propylene oxide adduct of 2,2-bis(4-hydroxyphenyl)propane and an ethylene oxide adduct of 2,2-bis(4-hydroxyphenyl)propane.

<7> The asphalt composition for road pavement as set forth in any one of <1> to <6>, wherein a molar ratio of the propylene oxide adduct of bisphenol A to the ethylene oxide adduct of bisphenol A is preferably 10/90 or more, more preferably 20/80 or more, and still more preferably 30/70 or more, and it is preferably 70/30 or less, more preferably 60/40 or less, and still more preferably 50/50 or less.

<8> The asphalt composition for road pavement as set forth in any one of <1> to <7>, wherein the carboxylic acid component of the polyester resin contains terephthalic acid.

<9> The asphalt composition for road pavement as set forth in any one of <1> to <8>, wherein, in the carboxylic acid component, an amount of at least one selected from terephthalic acid and isophthalic acid is 50 mol % or more, preferably 60 mol % or more, preferably 80 mol % or more, and more preferably 100 mol %.

<10> The asphalt composition for road pavement as set forth in any one of <1> to <9>, wherein an acid value of the polyester resin is preferably 2 mgKOH/g or more, more preferably 3 mgKOH/g or more, and still more preferably 3.5 mgKOH/g or more, and it is preferably 15 mgKOH/g or less, more preferably 12 mgKOH/g or less, and still preferably 10 mgKOH/g or less.

<11> The asphalt composition for road pavement as set forth in any one of <1> to <10>, wherein a hydroxyl group value of the polyester resin is 20 mgKOH/g or more, and it is 50 mgKOH/g or less, and preferably 45 mgKOH/g or less.

<12> The asphalt composition for road pavement as set forth in any one of <1> to <11>, wherein a softening point of the polyester resin is 95° C. or higher, and preferably 100° C. or higher, and it is 130° C. or lower.

<13> The asphalt composition for road pavement as set forth in any one of <1> to <12>, wherein a glass transition point of the polyester resin is preferably 50° C. or higher, and more preferably 55° C. or higher, and it is preferably 80° C. or lower, and more preferably 70° C. or lower.

<14> The asphalt composition for road pavement as set forth in any one of <1> to <13>, wherein a ratio of the polyester resin is 5 parts by mass or more, preferably 8 parts by mass or more, more preferably 10 parts by mass or more, and still more preferably 15 parts by mass or more, and it is 50 parts by mass or less, preferably 40 parts by mass or less, and more preferably 30 parts by mass or less, based on 100 parts by mass of the asphalt.

<15> The asphalt composition for road pavement as set forth in any one of <1> to <14>, wherein the polyester resin is one blended with a polyester resin particle having an average particle diameter of 200 μm or more and 1,700 μm or less.

<16> The asphalt composition for road pavement as set forth in any one of <1> to <15>, wherein an average particle diameter of the polyester resin particle is preferably 200 μm or more, more preferably 400 μm or more, and still more preferably 600 μm or more, and it is preferably 1,700 μm or less, more preferably 1,500 μm or less, and still more preferably 1,200 μm or less.

<17> The asphalt composition for road pavement as set forth in any one of <1> to <16>, wherein the aggregate contains a coarse aggregate having a particle diameter of 2.5 mm or more and a fine aggregate having a particle diameter of less than 2.5 mm.

<18> The asphalt composition for road pavement as set forth in any one of <1> to <17>, wherein a mass ratio of the coarse aggregate to the fine aggregate is preferably 10/100 or more, more preferably 20/100 or more, and still more preferably 30/100 or more, and it is preferably 90/100 or less, more preferably 80/100 or less, and still more preferably 70/100 or less.

<19> The asphalt composition for road pavement as set forth in any one of <1> to <18>, wherein a content of the aggregate is preferably 1,000 parts by mass or more, more preferably 1,200 parts by mass or more, and still more preferably 1,500 parts by mass or more, and it is preferably 3,000 parts by mass or less, more preferably 2,500 parts by mass or less, and still more preferably 2,000 parts by mass or less, based on 100 parts by mass of a sum total of the asphalt and the polyester resin.

<20> The asphalt composition for road pavement as set forth in any one of <1> to <19>, including 30% by volume or more and less than 45% by volume of the coarse aggregate, 30% by volume or more and 50% by volume or less of the fine aggregate, 5% by volume or more and 10% by volume or less of the asphalt, and the polyester resin.

<21> The asphalt composition for road pavement as set forth in any one of <1> to <19>, including 45% by volume or more and less than 70% by volume of the coarse aggregate, 20% by volume or more and 45% by volume or less of the fine aggregate, 3% by volume or more and 10% by volume or less of the asphalt, and the polyester resin.

<22> The asphalt composition for road pavement as set forth in any one of <1> to <19>, including 70% by volume or more and 80% by volume or less of the coarse aggregate, 10% by volume or more and 20% by volume or less of the fine aggregate, 3% by volume or more and 10% by volume or less of the asphalt and the polyester resin.

<23> The asphalt composition for road pavement as set forth in any one of <1> to <22>, which is obtained by mixing the asphalt, the polyester resin, and the aggregate at 130° C. or higher and 200° C. or lower for 30 seconds or more.

<24> A method for producing an asphalt composition for road pavement including:
Step 1 of mixing asphalt, a polyester resin, and an aggregate at 130° C. or higher and 200° C. or lower for 30 seconds or more,
wherein the polyester resin is a polyester having an alcohol component-derived constituent unit containing 65 mol % or more of an alkylene oxide adduct of bisphenol A and a carboxylic acid component-derived constituent unit containing 50 mol % or more of at least one selected from the group consisting of terephthalic acid and isophthalic acid and has a softening point of 95° C. or higher and 130° C. or lower and a hydroxyl group value of 20 mgKOH/g or more and 50 mgKOH/g or less, and the polyester resin is mixed in a ratio of 5 parts by mass or more and 50 parts by mass or less based on 100 parts by mass of the asphalt.

<25> The method for producing an asphalt composition for road pavement as set forth in <24>, wherein the mixing temperature in Step 1 is preferably a temperature higher than the softening point of the polyester resin; and it is preferably 140° C. or higher, and it is preferably 190° C. or lower, and more preferably 180° C. or lower.

<26> The method for producing an asphalt composition for road pavement as set forth in <24> or <25>, wherein the mixing time in Step 1 is one hour or less.

<27> The method for producing an asphalt composition for road pavement as set forth in any one of <24> to <26>, wherein the asphalt composition for road pavement is the asphalt composition for road pavement as set forth in any one of <1> to <23>.

<28> A road paving method including Step 2 of laying the asphalt composition obtained by the production method as set forth in any one of <24> to <27>, thereby forming an asphalt paving material layer.

<29> The road paving method as set forth in <28>, wherein after laying, compacting laying is carried out.

<30> The road paving method as set forth in <28> or <29>, wherein a compacting temperature of the asphalt composition is preferably 100° C. or higher, more preferably 120° C. or higher, and still more preferably 130° C. or higher, and it is preferably 200° C. or lower, more preferably 180° C. or lower, and still more preferably 170° C. or less.

EXAMPLES

Respective physical values of resins and the like were measured and evaluated by the following methods.

Acid Value and Hydroxyl Group Value of Polyester Resin

An acid value and a hydroxyl group value of a polyester resin were measured on the basis of the method of JIS K0070. However, only the measuring solvent was changed from a mixed solvent of ethanol and ether as prescribed in JIS K0070 to a mixed solvent of acetone and toluene (acetone/toluene=1/1 (volume ratio)).

Softening Point and Glass Transition Point of Polyester Resin (1) Softening Point:
Using a flow tester "CFT-500D" (manufactured by Shimadzu Corporation), while heating 1 g of a sample at a temperature rise rate of 6° C./min, a load of 1.96 MPa was applied by a plunger, and the sample was extruded through a nozzle having a diameter of 1 mm and a length of 1 mm. The amount of descent of the plunger of the flow tester versus the temperature was plotted, and a temperature at which a half amount of the sample flowed out was defined as the softening point of the sample.

(2) Maximum Endothermic Peak Temperature:
Using a differential scanning calorimeter "Q-100" (manufactured by TA Instruments Japan Inc.), a sample which had been cooled from room temperature (20° C.) to 0° C. at a temperature drop rate of 10° C./min was kept at that temperature for one minute, and thereafter, the resulting sample was measured while raising the temperature to 180° C. at a temperature rise rate of 10° C./min. Among observed endothermic peaks, a temperature of the peak existent on the highest temperature side was defined as the maximum endothermic peak temperature of the sample.

(3) Glass Transition Point:
Using a differential scanning calorimeter "Q-100" (manufactured by TA Instruments Japan Inc.), 0.01 to 0.02 g of a sample was weighed in an aluminum pan, subjected to temperature rise to 200° C., and then cooled from that temperature to 0° C. at a temperature drop rate of 10° C./min. Subsequently, the resulting sample was measured while raising the temperature to 150° C. at a temperature rise rate of 10° C./min. A temperature at which an extension of a baseline of not higher than the maximum endothermic peak temperature was intersected with a tangential line having a maximum inclination of the curve in a region of from a rise-up portion of the peak to an apex of the peak was read as the glass transition point of the sample.

Measurement Method of Average Particle Diameter of Polyester Resin Particle

The average particle diameter of the polyester resin particle was measured in conformity with the sieving method according to JIS Z8815. 100 g of resin particles was sieved with seven sieves having a sieve opening of 2,830 μm, 2,000 μm, 1,400 μm, 850 μm, 600 μm, 425 μm, and 106 μm, respectively by using a Ro-Tap sieve shaker (manufactured by CMT Co., Ltd.), thereby determining the average particle diameter of the polyester resin particles.

Solid Content Concentration of Aqueous Dispersion of Polyester Resin Particle

Using an infrared moisture balance "FD-230" (manufactured by Kett Electric Laboratory), 5 g of a sample was dried at a drying temperature of 150° C. under conditions in a measurement mode 96 (monitoring time: 2.5 minutes, fluctuation range: 0.05%), thereby measuring the moisture of the sample (% by mass). The solid content concentration was calculated according to the following formula.

Solid content concentration (% by mass)=100−(Moisture of sample)(% by mass)

Dry Strength

Each of molded articles obtained in Examples and Comparative Examples as described later was stored in air at room temperature for 24 hours, then immersed in water at 25° C. for 2 hours. Next, retrieved from water bath, dried with a wipe, and immediately applied with a pressure of 5.08 mm/min using the following instrument. The drying strength was calculated in terms of a load which the sample could endure.

The pressure was calculated in terms of KiloNewton/surface area.

Instrument: Resistance assessment press (Mecánica Científica, S.A., model Ref. 41.000)

Strength after Immersion in Water

Each of molded articles obtained in Examples and Comparative Examples as described later was immersed in water at 60° C. for 24 hours, and further immersed in water at 25° C. for 2 hours. Next, retrieved from water bath, and dried with a wipe. Then, the strength was measured.

Strength after Immersion in Petroleum

Each of molded articles obtained in Examples and Comparative Examples as described later was immersed in gasoline (Varsol 60, petroleum heavy nafta hydrodesulfurized, boiling range: 90° C. to 230° C.) for 24 hours and then washed away with water, and further immersed in water at 25° C. for 2 hours. Next, retrieved from water bath, and dried with a wipe. Then, the strength was measured.

Production Examples 1 to 14 (Polyester Resin a1 to a14)

An alcohol component and a carboxylic acid component for a polyester resin, which are shown in Table 1 along with the used amount, 50 g of tin(II) di(2-ethylhexanoate), and 2 g of gallic acid were added and charged in a 10 liter-volume four-necked flask equipped with a thermometer, a stainless steel-made stirring rod, a dewatering tube, a flow-down type condenser, and a nitrogen inlet tube, and the contents were allowed to react with each other at 235° C. for 8 hours in a mantle heater under a nitrogen atmosphere. Thereafter, the resultant was allowed to react at 8 kPa for one hour. There were thus obtained desired polyester resins a1 to a14.

Each of the resulting polyester resins was pulverized using a pulverizer "SF-1" (manufactured by Sanriki Seisakusho Co., Ltd.). A resin having a desired particle diameter was obtained by controlling the screen opening and the rotation rate. The results of the average particle diameter are shown in Table 1.

TABLE 1

| | | Production Example | | | | | | | |
|---|---|---|---|---|---|---|---|---|---|
| | | 1 | | 2 | | 3 | | 4 | |
| | | Polyester resin | | | | | | | |
| | | a1 | | a2 | | a3 | | a4 | |
| | | g | mol %*3 | g | mol %*3 | g | mol %*3 | g | |
| Raw material monomer | | | | | | | | | |
| Alcohol component | BPA-PO*1 | 2205 | 35 | 2205 | 35 | 1512 | 24 | 3150 | |
| | BPA-EO*2 | 3803 | 65 | 3803 | 65 | 4446 | 76 | 2925 | |
| Carboxylic acid component | Terephthalic acid | 2809 | 94 | 2928 | 98 | 2749 | 92 | 2390 | |
| | Trimellitic anhydride | | | | | | | 276 | |
| Physical properties | | | | | | | | | |
| Softening point (° C.) | | 111.5 | | 119.8 | | 101.3 | | 126.5 | |
| Acid value (mgKOH/g) | | 3.8 | | 5.3 | | 2.9 | | 8.7 | |
| Hydroxyl group value (mgKOH/g) | | 28.7 | | 21.4 | | 37.2 | | 40.2 | |
| Glass transition point (° C.) | | 64.1 | | 67.8 | | 60.5 | | 62.9 | |
| Particle diameter (μm) | | 850 | | 1220 | | 700 | | 950 | |

| | | Production Example | | | | | | | |
|---|---|---|---|---|---|---|---|---|---|
| | | 4 | | 5 | | 6 | | 7 | |
| | | Polyester resin | | | | | | | |
| | | a4 | | a5 | | a6 | | a7 | |
| | | mol %*3 | g | mol %*3 | g | mol %*3 | g | mol %*3 | |
| Raw material monomer | | | | | | | | | |
| Alcohol component | BPA-PO*1 | 50 | 3150 | 50 | 6237 | 99 | 4410 | 70 | |
| | BPA-EO*2 | 50 | 2925 | 50 | 59 | 1 | 1755 | 30 | |
| Carboxylic acid component | Terephthalic acid | 80 | 1793 | 60 | 2420 | 81 | 2510 | 84 | |
| | Trimellitic anhydride | 8 | 691 | 20 | | | | | |
| Physical properties | | | | | | | | | |
| Softening point (° C.) | | 126.5 | | 142.7 | | 100.3 | | 91.3 | |
| Acid value (mgKOH/g) | | 8.7 | | 6.5 | | 4.2 | | 13.7 | |
| Hydroxyl group value (mgKOH/g) | | 40.2 | | 41.3 | | 57.3 | | 48.8 | |
| Glass transition point (° C.) | | 62.9 | | 65.8 | | 59.5 | | 52.3 | |
| Particle diameter (μm) | | 950 | | 1000 | | 600 | | 600 | |

| | | Production Example | | | | | | | |
|---|---|---|---|---|---|---|---|---|---|
| | | 8 | | 9 | | 10 | | 11 | |
| | | Polyester resin | | | | | | | |
| | | a8 | | a9 | | a10 | | a11 | |
| | | g | mol %*3 | g | mol %*3 | g | mol %*3 | g | |
| Raw material monomer | | | | | | | | | |
| Alcohol component | BPA-PO*1 | 2205 | 35 | 2205 | 35 | 2205 | 35 | 2205 | |
| | BPA-EO*2 EG | 3803 | 65 | 3803 | 65 | 3803 | 65 | 3803 | |

TABLE 1-continued

|  |  |  |  |  |  |  |  |  |
|---|---|---|---|---|---|---|---|---|
| Carboxylic Acid component | Terephthalic acid | 2938 | 98 | 2689 | 90 | 2809 | 94 | 2809 |
|  | Adipic acid |  |  | 691 | 17 | 441 | 17 |  |
|  | Isophthalic acid |  |  |  |  |  |  |  |
| Physical properties |  |  |  |  |  |  |  |  |
| Softening point (° C.) |  | 106.4 |  | 110.4 |  | 110.4 |  | 111.5 |
| Acid value (mgKOH/g) |  | 16.7 |  | 34.8 |  | 4.2 |  | 3.8 |
| Hydroxyl group value (mgKOH/g) |  | 38.9 |  | 15.3 |  | 29.1 |  | 28.7 |
| Glass transition point (° C.) |  | 63.4 |  | 64.5 |  | 63.9 |  | 64.1 |
| Particle diameter (μm) |  | 950 |  | 1000 |  | 1600 |  | 470 |

| | | Production Example | | | | | | |
|---|---|---|---|---|---|---|---|---|
| | | 11 | | 12 | | 13 | | 14 |
| | | Polyester resin | | | | | | |
| | | a11 | | a12 | | a13 | | a14 |
| | | mol %*[3] | g | mol %*[3] | g | mol %*[3] | g | mol %*[3] |
| Raw material monomer | | | | | | | | |
| Alcohol component | BPA-PO*[1] | 35 | 2205 | 35 | 1890 | 30 | 2205 | 35 |
| | BPA-EO*[2] | 65 | 2633 | 45 | 1755 | 30 | 3803 | 65 |
| | EG | | | 20 | 223 | 40 | 446 | |
| Carboxylic Acid component | Terephthalic acid | 94 | 2809 | 94 | 2809 | 94 | 2809 | |
| | Adipic acid | | | | | | | |
| | Isophthalic acid | | | | | | | 96 | 2868 |
| Physical properties | | | | | | | | |
| Softening point (° C.) | | 111.5 | | 108.9 | | 107.4 | | 112.6 |
| Acid value (mgKOH/g) | | 3.8 | | 4.2 | | 6.5 | | 3.5 |
| Hydroxyl group value (mgKOH/g) | | 28.7 | | 30.6 | | 33.8 | | 24.7 |
| Glass transition point (° C.) | | 64.1 | | 62.8 | | 61.9 | | 60.7 |
| Particle diameter (μm) | | 470 | | 800 | | 700 | | 1130 |

*[1]BPA-PO: Poly propylene oxide (2.2) adduct of bisphenol A
*[2]BPA-EO: Poly ethylene oxide (2.2) adduct of bisphenol A
*[3]Molar amount relative to 100 mols of alcohol component (mol %)

Example 1 (Asphalt Composition)

Among 80 g of straight asphalt, 20 g of the polyester resin, 600 g of crushed stone (coarse aggregate) of 2.5 to 13 mm, and 1,200 g of sand (fine aggregate) of less than 2.5 mm, the materials other than the straight asphalt were charged in a mixing machine for asphalt and mixed at 160° C. for 1 minutes. Subsequently, the straight asphalt was added, and the contents were mixed for 2 minutes (asphalt mechanical mixer: Mecánica Científica, S.A., model Ref. 25.0000). The resulting mixture was charged in a cylindrical molding machine having an inner diameter of 101.6 mm, an outer diameter of 114.3 mm, and a height of 177.8 mm at that temperature and molded using a compaction hydraulic press (Mecánica Científica, S.A., model Ref. 10.2196) while increasing the pressure to 21 MPa over 3 minutes. After keeping the pressure at 21 MPa for 2 minutes, the resultant was subjected to depressurization and then cooled to room temperature for 24 hours, after which, the asphalt briquette was demolded. The various evaluation tests were carried out. The results are shown in Table 2.

Examples 2 to 12 and Comparative Examples 1 to 7 (Asphalt Compositions)

Asphalt compositions were prepared in the same manner as in Example 1, except for blending the components as shown in Table 2. The various evaluation tests were carried out. The results are shown in Table 2.

TABLE 2

| | Blending | | | | | | | Evaluation | | |
|---|---|---|---|---|---|---|---|---|---|---|
| | amount of | Polyester resin | | Aggregate 1 | | Aggregate 2 | | | Strength | Strength |
| | straight asphalt (parts by mass)*[1] | Kind | Amount*[1] (parts by mass) | Kind | Amount*[1] (parts by mass) | Kind | Amount*[1] (parts by mass) | Drying strength (kPa) | after immersion in water (kPa) | after immersion in petroleum (kPa) |
| Example 1 | 80 | a1 | 20 | b1 | 600 | b2 | 1200 | 5200 | 4000 | 4000 |
| Example 2 | 80 | a2 | 20 | b1 | 600 | b2 | 1200 | 4400 | 3800 | 3200 |
| Example 3 | 80 | a3 | 20 | b1 | 600 | b2 | 1200 | 4300 | 3000 | 3600 |
| Example 4 | 80 | a4 | 20 | b1 | 600 | b2 | 1200 | 3900 | 2900 | 2800 |

TABLE 2-continued

| | Blending amount of straight asphalt (parts by mass)*1 | Polyester resin Kind | Polyester resin Amount*1 (parts by mass) | Aggregate 1 Kind | Aggregate 1 Amount*1 (parts by mass) | Aggregate 2 Kind | Aggregate 2 Amount*1 (parts by mass) | Evaluation Drying strength (kPa) | Evaluation Strength after immersion in water (kPa) | Evaluation Strength after immersion in petroleum (kPa) |
|---|---|---|---|---|---|---|---|---|---|---|
| Comparative Example 1 | 80 | a5 | 20 | b1 | 600 | b2 | 1200 | 3200 | 2500 | 1100 |
| Comparative Example 2 | 80 | a6 | 20 | b1 | 600 | b2 | 1200 | 4100 | 2100 | 2700 |
| Comparative Example 3 | 80 | a7 | 20 | b1 | 600 | b2 | 1200 | 3100 | 2300 | 2000 |
| Example 5 | 80 | a8 | 20 | b1 | 600 | b2 | 1200 | 3700 | 2800 | 2900 |
| Comparative Example 4 | 80 | a9 | 20 | b1 | 600 | b2 | 1200 | 3700 | 2200 | 1300 |
| Example 6 | 80 | a10 | 20 | b1 | 600 | b2 | 1200 | 4500 | 3300 | 3100 |
| Example 7 | 80 | a11 | 20 | b1 | 600 | b2 | 1200 | 4200 | 3100 | 3400 |
| Example 8 | 80 | a12 | 20 | b1 | 600 | b2 | 1200 | 4500 | 2800 | 2500 |
| Comparative Example 5 | 80 | a13 | 20 | b1 | 600 | b2 | 1200 | 3000 | 2100 | 1600 |
| Example 9 | 95 | a1 | 5 | b1 | 600 | b2 | 1200 | 3500 | 2700 | 2300 |
| Example 10 | 90 | a1 | 10 | b1 | 600 | b2 | 1200 | 4300 | 3500 | 3200 |
| Example 11 | 70 | a1 | 30 | b1 | 600 | b2 | 1200 | 4500 | 3800 | 3700 |
| Comparative Example 6 | 60 | a1 | 40 | b1 | 600 | b2 | 1200 | 3100 | 2600 | 2700 |
| Comparative Example 7 | 100 | None | 0 | b1 | 600 | b2 | 1200 | 2800 | 2000 | 1200 |
| Example 12 | 80 | a14 | 20 | b1 | 600 | b2 | 1200 | 4800 | 3900 | 3900 |

*1Amount based on 100 parts by mass of a total amount of asphalt and polyester resin (parts by mass)
b1: Crushed stone of 2.5 to 13 mm
b2: Sand of less than 2.5 mm In the light of the above, it can be understood that the asphalt compositions of the Examples are excellent in the dry strength, the strength after immersion in water, and the strength after immersion in petroleum as compared with those of the Comparative Examples.

The invention claimed is:

1. An asphalt composition for road pavement comprising:
   asphalt;
   a polyester resin; and
   an aggregate,
   wherein the polyester resin is a polyester having an alcohol component-derived constituent unit containing 65 mol % or more of an alkylene oxide adduct of bisphenol A and a carboxylic acid component-derived constituent unit containing 50 mol % or more of at least one selected from the group consisting of terephthalic acid and isophthalic acid and has a softening point of 95° C. or higher and 130° C. or lower and a hydroxyl group value of 20 mgKOH/g or more and 50 mgKOH/g or less,
   the polyester resin is one having a polyester resin particle having an average particle diameter of 200 μm or more and 1,700 μm or less blended therein, and
   a ratio of the polyester resin is 5 parts by mass or more and 50 parts by mass or less based on 100 parts by mass of the asphalt.

2. The asphalt composition for road pavement according to claim 1, wherein
   a glass transition point of the polyester resin is 50° C. or higher and 80° C. or lower.

3. The asphalt composition for road pavement according to claim 1, wherein
   an acid value of the polyester resin is 2 mgKOH/g or more and 15 mgKOH/g or less.

4. The asphalt composition for road pavement according to claim 1, wherein
   the alkylene oxide adduct of bisphenol A is a mixture of a propylene oxide adduct of bisphenol A and an ethylene oxide adduct of bisphenol A, and a molar ratio of the propylene oxide adduct of bisphenol A to the ethylene oxide adduct of bisphenol A is 10/90 or more and 70/30 or less.

5. The asphalt composition for road pavement according to claim 1, wherein
   a proportion of a dihydric alcohol-derived constituent component and a divalent carboxylic acid-derived constituent component in the polyester resin is 95 mol % or more.

6. The asphalt composition for road pavement according to claim 1, wherein
   the asphalt composition is one obtained by mixing the asphalt, the polyester resin, and the aggregate at 130° C. or higher and 200° C. or lower for 30 seconds or more.

7. A method for producing an asphalt composition for road pavement comprising:
   a step of mixing asphalt, a polyester resin, and an aggregate at 130° C. or higher and 200° C. or lower for 30 seconds or more,
   wherein the polyester resin is a polyester having an alcohol component-derived constituent unit containing 65 mol % or more of an alkylene oxide adduct of bisphenol A and a carboxylic acid component-derived constituent unit containing 50 mol % or more of at least one selected from the group consisting of terephthalic acid and isophthalic acid and has a softening point of 95° C. or higher and 130° C. or lower and a hydroxyl group value of 20 mgKOH/g or more and 50 mgKOH/g or less,
   the polyester resin is a polyester resin particle having an average particle diameter of 200 μm or more and 1,700 μm or less, and the polyester resin is mixed in a ratio of 5 parts by mass or more and 50 parts by mass or less based on 100 parts by mass of the asphalt.

8. The method for producing an asphalt composition for road pavement according to claim 7, wherein the asphalt is straight asphalt.

9. A road paving method comprising a step of laying an asphalt composition obtained by the method according to claim 7, thereby forming an asphalt paving material layer.

* * * * *